(12) United States Patent
Yun et al.

(10) Patent No.: US 11,296,733 B2
(45) Date of Patent: Apr. 5, 2022

(54) COMMUNICATION APPARATUS AND METHOD

(71) Applicant: Samsung Electronics Co., Ltd., Suwon-si (KR)

(72) Inventors: Seok Ju Yun, Hwaseong-si (KR); Joonseong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 16/930,445

(22) Filed: Jul. 16, 2020

(65) Prior Publication Data

US 2021/0194519 A1 Jun. 24, 2021

(30) Foreign Application Priority Data

Dec. 19, 2019 (KR) .................. 10-2019-0170827

(51) Int. Cl.
| | | |
|---|---|---|
| *H04L 27/02* | (2006.01) | |
| *H04B 1/04* | (2006.01) | |
| *H04W 24/08* | (2009.01) | |
| *H04L 27/10* | (2006.01) | |
| *H04L 27/18* | (2006.01) | |

(52) U.S. Cl.
CPC .......... *H04B 1/0458* (2013.01); *H04W 24/08* (2013.01); *H04L 27/02* (2013.01); *H04L 27/10* (2013.01); *H04L 27/18* (2013.01)

(58) Field of Classification Search
CPC ....................................... H04L 27/02
USPC ....................................... 370/400
See application file for complete search history.

(56) References Cited

U.S. PATENT DOCUMENTS

| | | | |
|---|---|---|---|
| 7,169,928 B2 * | 1/2007 | Schwartz | ............... A61P 29/00 546/236 |
| 8,433,026 B2 | 4/2013 | Ballantyne et al. | |
| 8,446,191 B2 | 5/2013 | Dunworth et al. | |
| 8,754,797 B2 | 6/2014 | Gopinathan et al. | |
| 8,760,329 B2 | 6/2014 | Thiagarajan et al. | |

(Continued)

FOREIGN PATENT DOCUMENTS

| | | |
|---|---|---|
| JP | 6151361 B2 | 6/2017 |
| JP | 2018-37798 A | 3/2018 |

(Continued)

OTHER PUBLICATIONS

Vouilloz, Alexandre et al., "A Low-Power CMOS Super-Regenerative Receiver at 1 GHz." *IEEE Journal of Solid-State Circuits*, vol. 36, No. 3, 2001 (pp. 440-451).

(Continued)

*Primary Examiner* — Dang T Ton
(74) *Attorney, Agent, or Firm* — NSIP Law

(57) ABSTRACT

A communication apparatus and a communication method are provided. The communication apparatus includes an antenna configured to receive a wireless signal, an oscillator driven by a driving current and configured to generate an oscillating signal based on the wireless signal, a measurer configured to measure an oscillation degree of the oscillating signal, and an accumulator configured to accumulate a difference between a target value and a measurement value of the oscillation degree. A value of the wireless signal is determined based on a cumulative signal corresponding to the accumulated difference.

20 Claims, 12 Drawing Sheets

(56) References Cited

U.S. PATENT DOCUMENTS

| | | | |
|---|---|---|---|
| 8,830,106 | B2 | 9/2014 | Dasgupta et al. |
| 9,515,684 | B2 | 12/2016 | Ta et al. |
| 2017/0117862 | A1 | 4/2017 | Yun et al. |
| 2018/0019782 | A1 | 1/2018 | Yun |
| 2019/0052492 | A1 | 2/2019 | Yun et al. |
| 2019/0149376 | A1 | 5/2019 | Dai et al. |

FOREIGN PATENT DOCUMENTS

| | | |
|---|---|---|
| KR | 10-2018-0009214 A | 1/2018 |
| KR | 10-2018-0056874 A | 5/2018 |
| KR | 10-2019-0017613 A | 2/2019 |

OTHER PUBLICATIONS

Chen, Jia-Yi et al., "A Fully Integrated Auto-Calibrated Super-Regenerative Receiver in 0.13-μm CMOS." *IEEE Journal of Solid-State Circuits*, vol. 42, No. 9, 2007 (pp. 1976-1985).

Cho, Namjun et al., "A 10.8 mW Body Channel Communication/MICS Dual-Band Transceiver for a Unified Body Sensor Network Controller." *IEEE Journal of Solid-State Circuits*, vol. 44, No. 12, 2009 (pp. 3459-3468).

Liu, Yao-Hong et al., "A Super-regenerative ASK Receiver with ΔΣ Pulse-width Digitizer and SAR-based Fast Frequency Calibration for MICS Applications." *2009 Symposium on VLSI Circuits Digest of Technical Papers*, 2009 (pp. 38-39).

Copani, Tino et al., "A CMOS Low-Power Transceiver With Reconfigurable Antenna Interface for Medical Implant Applications." *IEEE transactions on microwave theory and techniques*, vol. 59 (5) 2011 (pp. 1369-1378).

Dingjuan, Chua., "RF Transceiver Design for Wireless Sensor Networks." *Doctoral Dissertation*, 2014 (pp. 1-145).

Rezaei, Vahid Dabbagh et al., "A Fully On-Chip 80-pJ/b OOK Super-Regenerative Receiver With Sensitivity-Data Rate Tradeoff Capability." *IEEE Journal of Solid-State Circuits*, vol. 53, No. 5, 2018 (pp. 1443-1456).

Analog Devices, "Sigma-Delta ADC Tutorial." *Analog Devices, Inc.*, Accessed on May 18, 2020 (pp. 1-2).

Extended European Search Report dated Mar. 5, 2021 in counterpart European Patent Application No. 20195185.2 (12 pages in English).

\* cited by examiner

COMMUNICATION APPARATUS AND METHOD

CROSS-REFERENCE TO RELATED APPLICATIONS

This application claims the benefit under 35 USC § 119(a) of Korean Patent Application No. 10-2019-0170827, filed on Dec. 19, 2019, in the Korean Intellectual Property Office, the entire disclosure of which is incorporated herein by reference for all purposes.

BACKGROUND

1. Field

The following description relates to a communication apparatus and communication method.

2. Description of Related Art

With the development of information and communication technologies, Internet of Things (IoT) devices that transmit and receive data in real time by attaching sensors to various devices or components, have become common. IoT devices are subminiature wireless transceivers that perform communications at low power to exchange and process information among distributed components. To implement subminiature and low-power communication systems of IoT devices, wireless communication systems with adequate reception sensitivity and low power should be performed without a response delay.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a communication apparatus includes an antenna configured to receive a wireless signal, an oscillator, configured to be driven by a driving current, and configured to generate an oscillating signal based on the wireless signal, a measurer configured to measure an oscillation degree of the oscillating signal; and an accumulator configured to accumulate a difference between a target value and a measurement value of the oscillation degree, wherein a value of the wireless signal is determined based on a cumulative signal corresponding to the accumulate difference.

The value of the wireless signal may be determined based on a change trend in the cumulative signal over a period of time.

The value of the wireless signal may be determined based on a determination that the cumulative signal gradually increases or decreases over a period of time.

The driving current may be controlled based on the cumulative signal.

A magnitude and/or a duty ratio of the driving current may be controlled based on the cumulative signal.

The oscillator may be further configured to generate the oscillating signal with a startup time that decreases as a magnitude and/or a duty ratio of the driving current increases.

The driving current is controlled to reduce a magnitude of the cumulative signal.

The measurement value may be determined based on any one or any combination of a frequency of the wireless signal and a magnitude and a duty ratio of the driving current.

The driving current may have a period less than or equal to ½ times a modulation period of the wireless signal.

The oscillator and the measurer may be configured to operate in an interval in which the driving current is high.

The oscillator may be further configured to operate in a free running mode.

The oscillator may be further configured to generate the oscillating signal that oscillates at one frequency among predetermined frequencies, based on the wireless signal.

The target value may be a value that ranges between measurement values output from the measurer in response to wireless signals received at the communication apparatus.

The driving current may be quenched.

the apparatus may include a delta-sigma modulator (DSM) configured to output the driving current, and control a variable capacitor of the oscillator based on a transmission signal, and transmit the transmission signal.

The wireless signal may be a signal that is modulated by any one or any combination of a frequency shift keying (FSK), an amplitude shift keying (ASK), and a phase shift keying (PSK).

The apparatus may include an amplifier configured to be driven by the driving current, and configured to amplify the oscillating signal and transfer the amplified oscillating signal to the measurer.

In a general aspect, a communication apparatus includes a radio frequency (RF) receiver configured to be driven by a driving current, and configured to generate an oscillating signal based on a received wireless signal, or configured to amplify the wireless signal, an integrator configured to integrate a frequency or a phase of the amplified wireless signal or the generated oscillating signal to generate an integrated oscillating signal; and a quantizer configured to quantize the integrated oscillating signal, wherein the value of the wireless signal is determined based on the quantized signal.

A magnitude and/or a duty ratio of the driving current may be controlled based on the quantized signal.

In a general aspect, a communication method includes generating an oscillating signal based on a wireless signal input to an antenna in a state in which a driving current is on, measuring an oscillation degree of the oscillating signal; and accumulating a difference between a target value and a measurement value of the oscillation degree, wherein the value of the wireless signal is determined based on a cumulative signal corresponding to the accumulated difference.

Other features and aspects will be apparent from the following detailed description, the drawings, and the claims.

Figure 1:
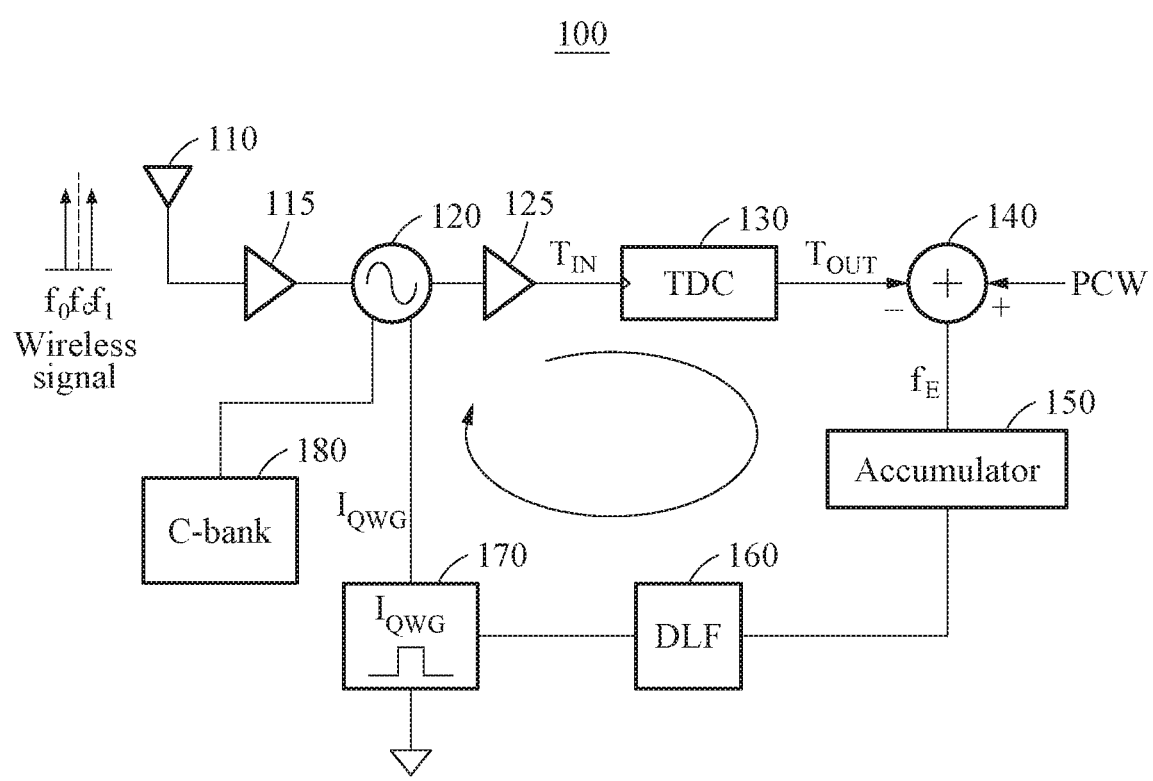
FIGS. 1 and 2 illustrate an example communication apparatus, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of the application, may be omitted for increased clarity and conciseness.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Figure 2:
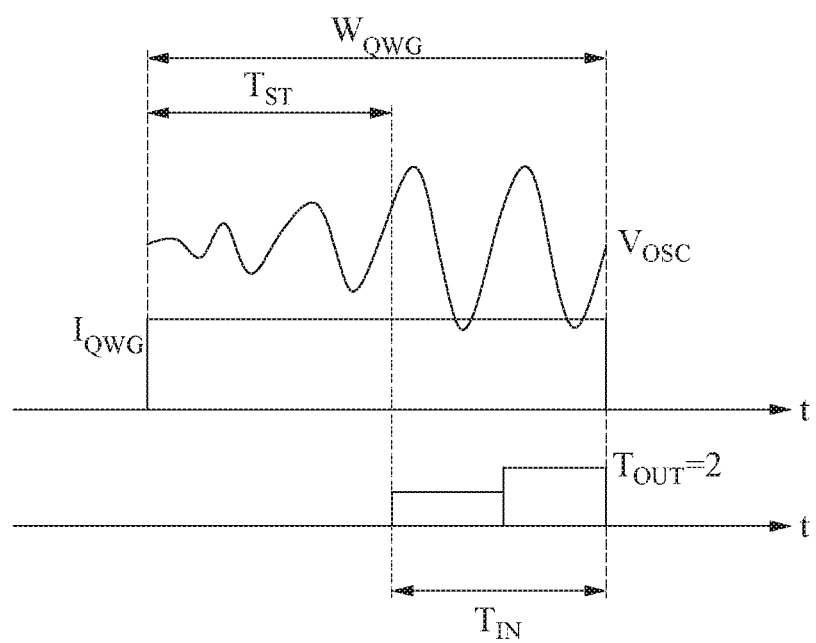

FIGS. 1 and 2 illustrate an example communication apparatus 100, in accordance with one or more embodiments.

Referring to FIG. 1, the communication apparatus 100 may include an antenna 110, an oscillator 120, a time-to-digital converter (TDC) 130, a subtractor 140, an accumulator 150, a digital low-pass filter (DLF) 160, a current source 170, and a capacitor-bank (C-bank) 180. The communication apparatus 100 may be an apparatus configured to receive or transmit a wireless signal, and may be implemented, as non-limiting examples, as a subminiature wireless transceiver, for example, a low-power communication device, an Internet of things (IoT) device, a bio-embedded communication device, or a medical implant communication system (MICS). Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The antenna 110 receives a wireless signal. The wireless signal is a signal transmitted and received via a wireless communication and may include, as non-limiting examples, a radio frequency (RF) signal. The RF signal may be a signal that is modulated by a frequency shift keying (FSK). The RF signal may be a signal that is modulated by an amplitude shift keying (ASK), an on-off keying (OOK), or a phase shift keying (PSK). For convenience of description, the following description is provided based on an example in which a wireless signal is modulated by the FSK so that a wireless signal with a frequency of $f_0$ represents "0" and a wireless signal with a frequency of $f_1$ represents "1". In this example, when a difference between the frequencies of $f_0$ and $f_1$ decreases, a spectrum efficiency increases. However, a high-resolution TDC that may sense a fine frequency difference may be beneficial. A method of implementing the high-resolution TDC will be described below.

The oscillator 120 is an apparatus that is driven by a driving current and is configured to generate an oscillating signal based on the wireless signal received from the antenna 110, and may be, for example, an inductor capacitor-voltage controlled oscillator (LC-VCO). The wireless signal received from the antenna 110 may be amplified by a low noise amplifier (LNA) and transferred to the oscillator 120.

A driving current may be in a form of a pulse with a predetermined amplitude and a duty ratio. In an example, when the driving current is high or on, the oscillator 120 may be driven to generate an oscillating signal based on the wireless signal. In another example, when the driving current is low or off, the oscillator 120 may not be driven. In this example, an oscillating signal may not be generated, and accordingly power may not be consumed. When the driving current is set to be high in a short interval and to be low in most intervals within a single period, the oscillator 120 may only be driven in the short interval in which the driving current is high, and accordingly an active state of the communication apparatus 100 may be minimized to minimize power consumption of the communication apparatus 100.

The oscillator 120 operates in a free running mode that is not fixed at a predetermined frequency, to generate an oscillating signal with a frequency corresponding to the wireless signal. In an example, when the wireless signal with the frequency $f_0$ is received by the antenna 110, the oscillator 120 may generate an oscillating signal with the frequency $f_0$. In another example, when the wireless signal with the frequency $f_1$ is received by the antenna 110, the oscillator 120 may generate an oscillating signal with the frequency $f_1$.

The TDC 130 is a measurer configured to measure an oscillation degree of an oscillating signal. The TDC 130 is also driven by the driving current. The TDC 130 is driven in an interval in which the driving current is high, and measures the oscillation degree of the oscillating signal.

FIG. 2 illustrates an example of a correlation among an oscillating signal $V_{OSC}$, a driving current $I_{QWG}$, and $T_{ST}$, $T_{IN}$ and $T_{OUT}$. When the driving current $I_{QWG}$ is high, the oscillator 120 may generate the oscillating signal $V_{OSC}$, and the TDC 130 may measure a time length of an interval in which a magnitude of the oscillating signal $V_{OSC}$ is greater than a predetermined threshold magnitude.

Referring to FIG. 2, $T_{ST}$ is an interval in which the magnitude of the oscillating signal $V_{OSC}$ is less than the threshold magnitude, and indicates a start-up time that is needed until the oscillating signal $V_{OSC}$ with a magnitude greater than a predetermined magnitude is output from the oscillator 120. Additionally, $T_{IN}$ is an interval in which the magnitude of the oscillating signal $V_{OSC}$ is greater than the threshold magnitude, and corresponds to the time length measured by the TDC 130. A sum of $T_{ST}$ and $T_{IN}$ may be $W_{QWG}$. $T_{OUT}$ may be a measurement value output from the TDC 130 and expressed as a positive number. Also, $W_{QWG}$ is a pulse width in which the driving current $I_{QWG}$ is high, and corresponds to an interval in which a current is supplied to the oscillator 120 to drive the oscillator 120.

Referring back to FIG. 1, the TDC 130 may generate a measurement value corresponding to a frequency of the oscillating signal. An oscillation degree of the oscillating signal with the frequency $f_0$ and an oscillation degree of the oscillating signal with the frequency $f_1$ measured by the TDC 130 may be different from each other. In other words, a measurement value $T_{OUT0}$ of the oscillating signal with the frequency $f_0$ and a measurement value $T_{OUT1}$ of the oscillating signal with the frequency $f_1$ may be different from each other.

The subtractor 140 calculates a difference between the measurement value $T_{OUT}$ of the TDC 130 and a target value phase control word (PCW). The target value PCW is a predetermined value, and includes, for example, a value ranging between measurement values that may be output from the TDC 130 based on a wireless signal. For example, the target value PCW may have a value between the measurement value $T_{OUT0}$ of the oscillating signal with the frequency $f_0$ and the measurement value $T_{OUT1}$ of the oscillating signal with the frequency $f_1$. The target value PCW may correspond to a measurement value of an oscillating signal oscillating at a central frequency $f_c$ between the frequencies $f_0$ and $f_1$. The target value PCW is set as described above, and accordingly the difference calculated by the subtractor 140 based on a frequency of a wireless signal may be a positive number or a negative number.

The accumulator 150 may accumulate values calculated by the subtractor 140. For example, the accumulator 150 may accumulate a difference between a target value and a measurement value of an oscillation degree.

A value or format of the wireless signal may be determined based on a cumulative signal output from the accumulator 150. The value or format of the wireless signal may be determined based on a change trend in the cumulative signal over time. For example, when the cumulative signal gradually increases over time, the wireless signal may be determined to be "0". When the cumulative signal gradually decreases over time, the wireless signal may be determined to be "1". Depending on examples, the value or format of the wireless signal may be determined in contrast to the above description.

The DLF 160 may perform a filtering operation that passes a low-frequency component of the cumulative signal output from the accumulator 150. The current source 170 may be controlled based on a signal passing through the DLF 160, and a low-pass filtering of the cumulative signal may be performed to prevent the current source 170 from being rapidly controlled. Depending on examples, a value or format of the wireless signal may be determined based on the cumulative signal passing through the DLF 160.

The current source 170 may generate a driving current with a predetermined magnitude and a duty ratio. The driving current is quenched to be periodically high or low, or on or off. The current source 170 may be a pulse generator configured to generate a driving current in a pulse form. The driving current generated by the current source 170 is provided to the oscillator 120. The communication apparatus 100 may have a feedback loop in which the driving current is controlled based on the cumulative signal.

The C-bank 180 may include a plurality of capacitors applied to the oscillator 120. The C-bank 180 may be controlled to adjust a driving frequency of the oscillator 120.

In FIG. 1, an amplifier 115 disposed between the antenna 110 and the oscillator 120 may amplify the wireless signal received by the antenna 110 and transfer the amplified wireless signal to the oscillator 120. An amplifier 125 disposed between the oscillator 120 and the TDC 130 may amplify the oscillating signal output from the oscillator 120 and transfer the amplified signal to the TDC 130.

A structure of FIG. 1 may be expanded to a structure in which an output of an RF inputter including the antenna 110 and the oscillator 120 is input to a delta-sigma TDC. In a principle of a delta-sigma structure, a value of an input signal is approximately predicted and an error is obtained and gradually corrected using accumulated errors. Based on the principle, when a cumulative error value is finite, an average value of input signals and an average value of output signals may be the same.

Figure 3:
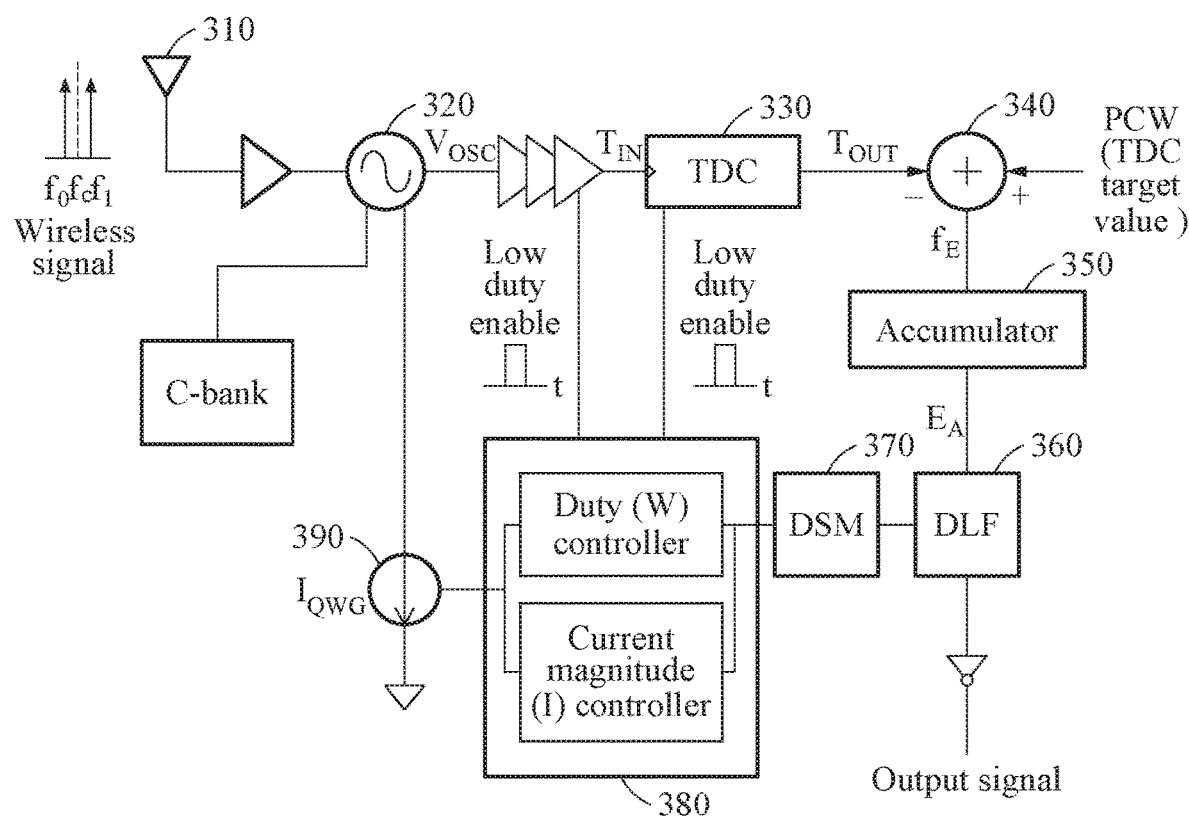
FIGS. 3 through 5 illustrate an example process of controlling a driving current in an example communication apparatus, in accordance with one or more embodiments.
Figure 4:
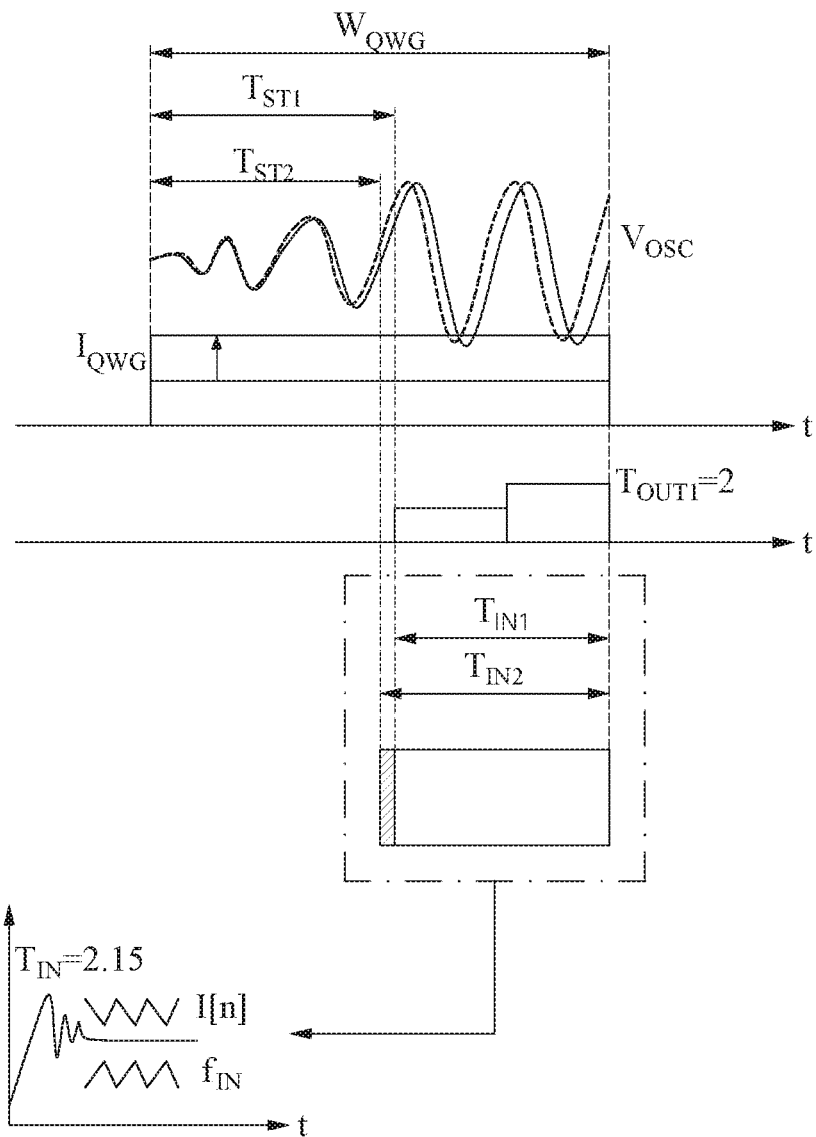
Figure 5:
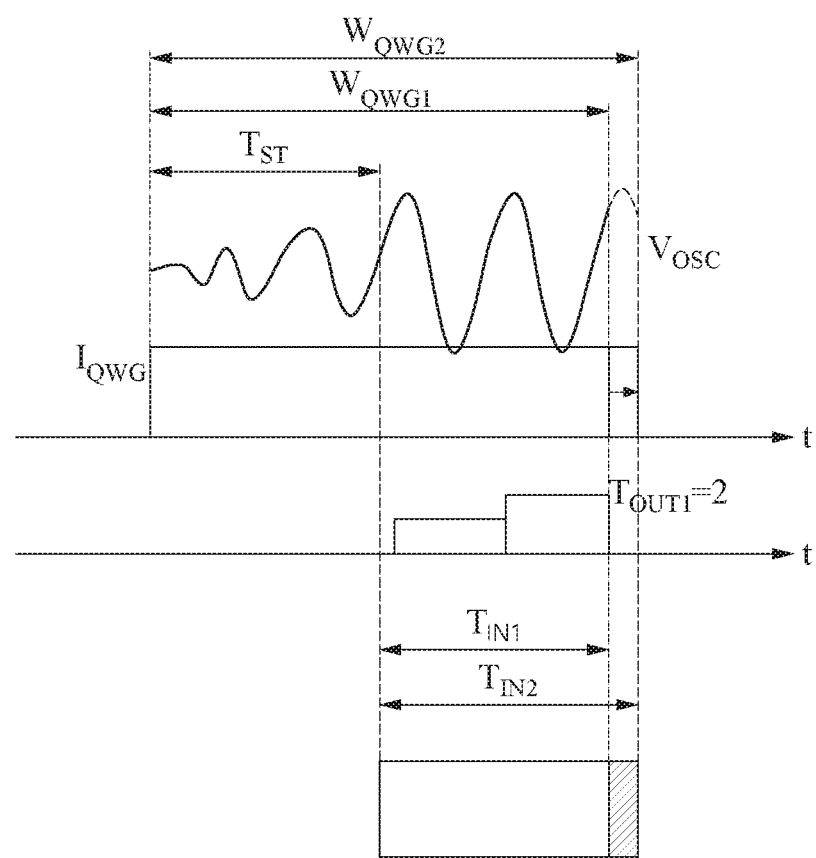

FIGS. 3 through 5 illustrate an example process of controlling a driving current in a communication apparatus, in accordance with one or more embodiments.

Referring to FIG. 3, a driving current of a communication apparatus may be controlled through a feedback loop. When a wireless signal is received by an antenna 310, an oscillating signal corresponding to the wireless signal is generated by an oscillator 320, and an oscillation degree, for example, an oscillation time or an oscillation interval, of the oscillating signal may be measured by a TDC 330. A subtractor 340 calculates a difference between a measurement value $T_{OUT}$ of the TDC 330 and a target value PCW, and an accumulator 350 accumulates a cumulative signal corresponding to the accumulated difference. A DLF 360 performs a filtering of the cumulative signal, and a value or format of the wireless signal is determined based on the filtered cumulative signal and is output. The filtered cumulative signal is transferred to a delta-sigma modulator (DSM) 370, and the DSM 370 controls a duty ratio and/or a magnitude of a driving current output from a current source 390. The duty ratio is a ratio of a current supplied within a single period of an operation quenching clock of the oscillator 320, and indicates an active interval. For example, a current source controller 380 controls a duty ratio and/or a magnitude of a current. The current source 390 generates a driving current with the controlled duty ratio and the controlled magnitude, and provides the driving current to the oscillator 320.

FIG. 4 illustrates an example of a control to increase a magnitude of a driving current. A start-up time of an oscillating signal before a magnitude of a driving current $I_{QWG}$ increases is $T_{ST1}$, and $T_{IN1}$ based on $T_{ST1}$ is determined as "$W_{QWG}-T_{ST1}$". When the magnitude of the driving current $I_{QWG}$ increases, the start-up time may decrease. For example, when the magnitude of the driving current $I_{QWS}$ increases, $T_{ST2}$ may be less than $T_{ST1}$ before the magnitude of the driving current $I_{QWS}$ increases. Since a width $W_{QWG}$ of the driving current $I_{QWG}$ remains unchanged, $T_{IN2}$ may become greater than $T_{IN1}$. Thus, $T_{OUT2}$ may become greater than $T_{OUT1}$ although $T_{OUT2}$ is not separately shown in FIG. 4. Based on a control of the magnitude of the driving current $I_{QWG}$, a value of $T_{IN}$ may also continue to be updated.

When $T_{ST}$ is controlled based on a control of a driving current and when the feedback loop is stabilized, $T_{IN}$ is expressed as shown in Equation 1 below.

$$PCW \times T_{RF} = T_{IN}, \text{steady state} \qquad \text{Equation 1:}$$

In Equation 1, $T_{RF}$ denotes a period of a wireless signal.

FIG. 5 illustrates an example of a control to increase a duty ratio of a driving current. The duty ratio is a ratio of a time in which the driving current is supplied with respect to a single period. An interval in which the driving current is supplied may also be referred to as an interval in which the driving current is high or on. A high duty ratio indicates that the driving current is mainly in a high state or an on state rather than a low state or off state within a single driving period. In FIG. 5, $W_{QWG1}$ and $T_{IN1}$ indicate a state prior to a duty ratio of a driving current $I_{QWG}$ increases. When the duty ratio of the driving current $I_{QWG}$ increases, a pulse width of the driving current $I_{QWS}$ also increases. Thus, $W_{QWG2}$ is greater than $W_{QWG1}$. A start-up time remains unchanged despite an increase in the duty ratio of the driving current $I_{QWG}$, and accordingly $T_{ST}$ may be maintained without a change. $W_{QWG2}$ increases even though $T_{ST}$ remains unchanged, and accordingly $T_{IN2}$ becomes greater than $T_{IN1}$. Thus, $T_{OUT2}$ may become greater than $T_{OUT1}$ although $T_{OUT2}$ is not separately shown in FIG. 5. Based on a control of the duty ratio of the driving current $I_{QWG}$, a value of $T_{IN}$ may also continue to be updated.

Numerical values shown in FIGS. 4 and 5 are for convenience of description and examples are not limited thereto.

A structure of FIG. 3 may be expanded to a structure in which an output of an RF inputter including the antenna 310 and the oscillator 320 is input to a delta-sigma TDC. In a principle of a delta-sigma structure, a value of an input signal is approximately predicted and an error is obtained and gradually corrected using accumulated errors. Based on the principle, when a cumulative error value is finite, an average value of input signals and an average value of output signals may be the same.

Figure 6:
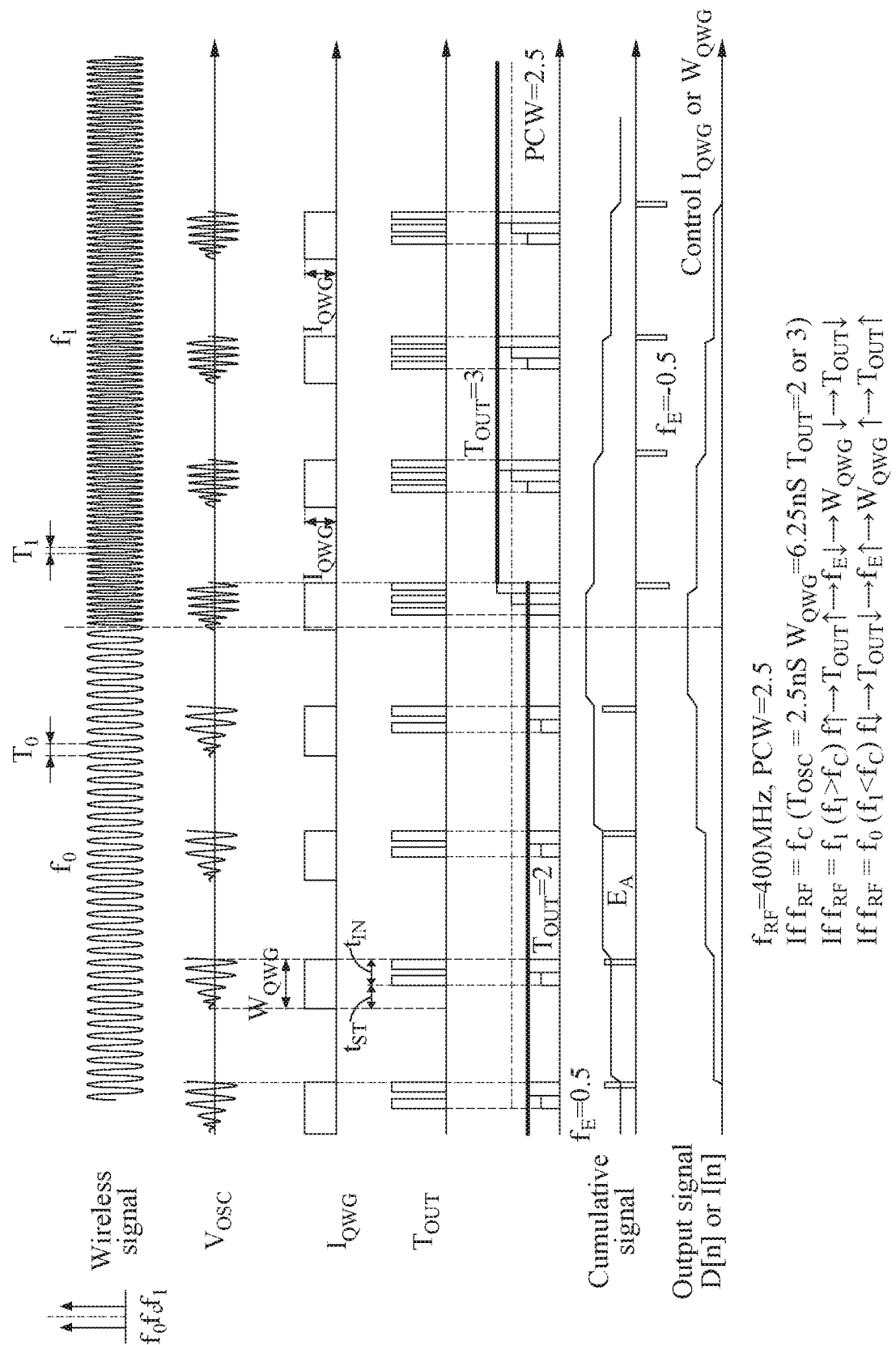
FIG. 6 illustrates an example timing diagram of a signal processed by a communication apparatus, in accordance with one or more embodiments.

FIG. 6 illustrates an example timing diagram of a signal processed by a communication apparatus, in accordance with one or more embodiments.

FIG. 6 illustrates a wireless signal, an oscillating signal $V_{OSC}$, a driving current $I_{QWG}$, a TDC measurement value $T_{OUT}$, a cumulative signal, an output signal, a signal D[n] to control a duty ratio of a driving current, and a signal I[n] to control a magnitude of a driving current. For convenience of description, a wireless signal with a frequency $f_0$ and a wireless signal with a frequency $f_1$ are assumed to be sequentially received. The driving current $I_{QWG}$ is in a form of a pulse with a predetermined magnitude and a duty ratio. When the driving current $I_{QWG}$ is high or on, an oscillator and a TDC may operate to generate an oscillating signal and a measurement value. A period of the driving current $I_{QWG}$ may be less than ½ times a modulation period of the wireless signal. When the driving current $I_{QWG}$ is high, an oscillating signal corresponding to the wireless signal may be generated in the oscillator and the wireless signal may be oversampled.

In an example, a pulse position of the driving current $I_{QWG}$ may be changed by a jitter. However, the value or format of the wireless signal is determined based on a cumulative signal corresponding to a difference between a target value and a measurement value of the TDC, and accordingly the wireless signal is not affected by the jitter. In other words, a communication apparatus may be considerably robust against the jitter.

In the example of FIG. 6, when the wireless signal with the frequency $f_0$ is received, an oscillating signal $V_{OSC}$ corresponding to the received wireless signal is generated and a measurement value $T_{OUT}$ of the oscillating signal $V_{OSC}$ may be to be "2". A difference $f_E$ between the measurement value $T_{OUT}$ and a target value PCW may be calculated by "PCW−$T_{OUT}$" and may be accumulated. When the wireless signal with the frequency $f_0$ is received, the cumulative signal may continue to increase because the difference $f_E$ is a positive number. When the wireless signal with the frequency $f_1$ is received, a measurement value $T_{OUT}$ of an oscillating signal $V_{OSC}$ corresponding to the received wireless signal may be determined to be "3", the difference $f_E$ may be determined as a negative number, and the cumulative signal may continue to decrease.

In an interval in which the cumulative signal gradually increases, reception of the wireless signal with the frequency $f_0$ may be verified, and accordingly the wireless signal is determined to be "0". In an interval in which the cumulative signal gradually decreases, reception of the wireless signal with the frequency $f_1$ is verified, and accordingly the wireless signal is determined to be "1".

Based on the cumulative signal, a magnitude and/or a duty ratio of the driving current $I_{QWG}$ may be controlled. The driving current $I_{QWG}$ may be controlled to reduce a magnitude of the cumulative signal. In an example, when a frequency of a received wireless signal is $f_0$, $T_{OUT}$ may be determined to be a value less than the target value PCW, and accordingly the difference $f_E$ may continue to increase. In this example, a pulse width $W_{QWG}$ of the driving current $I_{QWG}$ may be controlled to increase, and $T_{OUT}$ may also increase due to an increase in the pulse width $W_{QWG}$, as described above. Thus, both the difference $f_E$ and the cumulative signal may decrease. Similarly, when a frequency of a received wireless signal is the driving current $I_{QWG}$ may also be controlled to reduce the cumulative signal.

Numerical values shown in FIG. 6 are for convenience of description and examples are not limited thereto.

Figure 7:
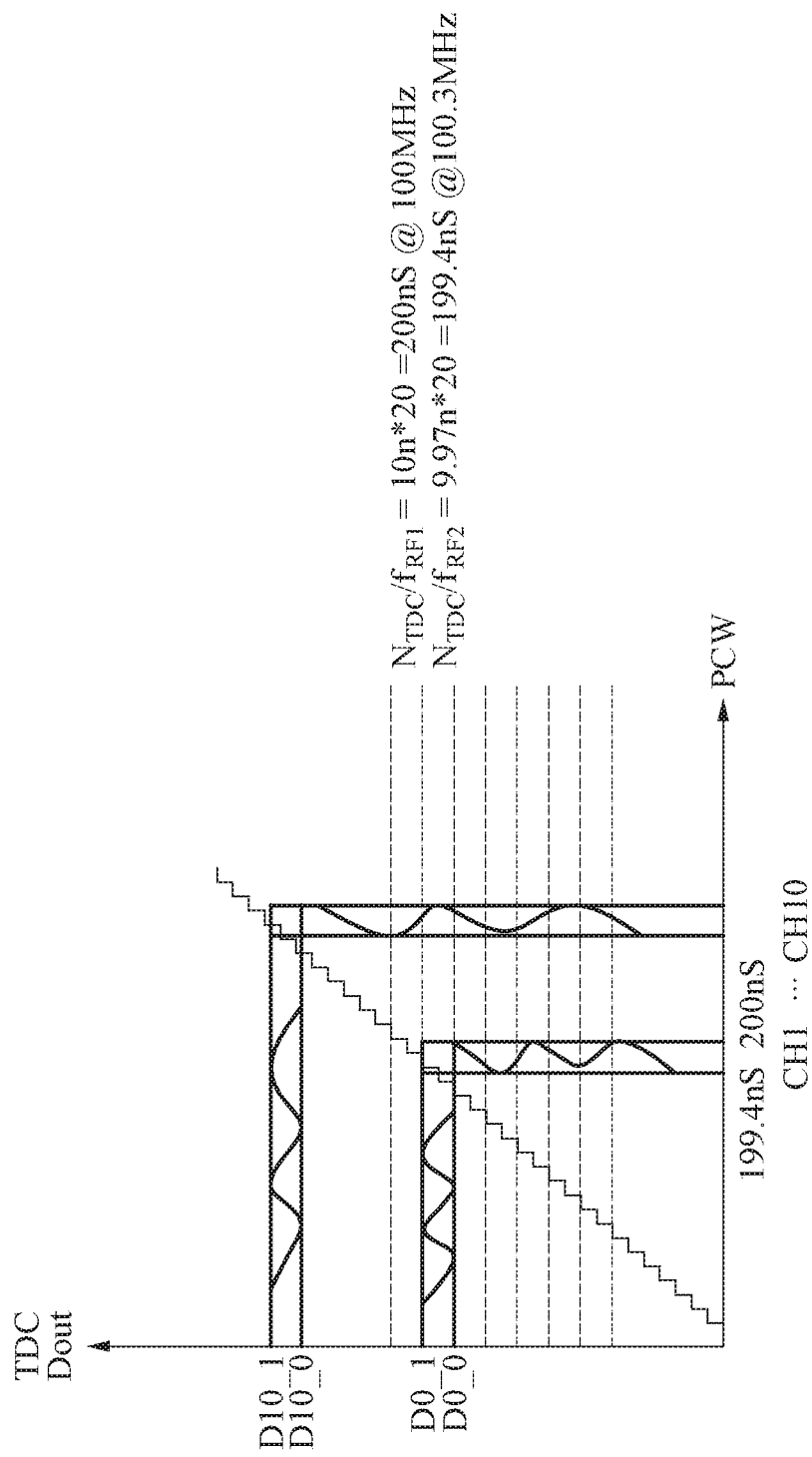
FIG. 7 illustrates an example multi-channel that may be processed in a communication apparatus, in accordance with one or more embodiments.

FIG. 7 illustrates an example of a multi-channel that may be processed in a communication apparatus, in accordance with one or more embodiments.

FIG. 7 illustrates an example of a process of performing a multi-channel communication in a communication apparatus. As described above, a measurement value of an oscillating signal which is output from a TDC changes based on a frequency of a wireless signal, and accordingly the multi-channel communication may be performed based on the above characteristic. Since the measurement value of the TDC includes frequency information of the wireless signal, a separate frequency synthesizer is not required. Additionally, based on the measurement value of the TDC, a determination may be made with regard to whether an interference occurs, an interference may be avoided, and a listen-before-talk (LBT) communication may also be implemented. When a resolution of the TDC increases by a method of processing a wireless signal in a time domain, a data rate may also increase. Numerical values shown in FIG. 7 are for convenience of description and examples are not limited thereto.

Figure 8:
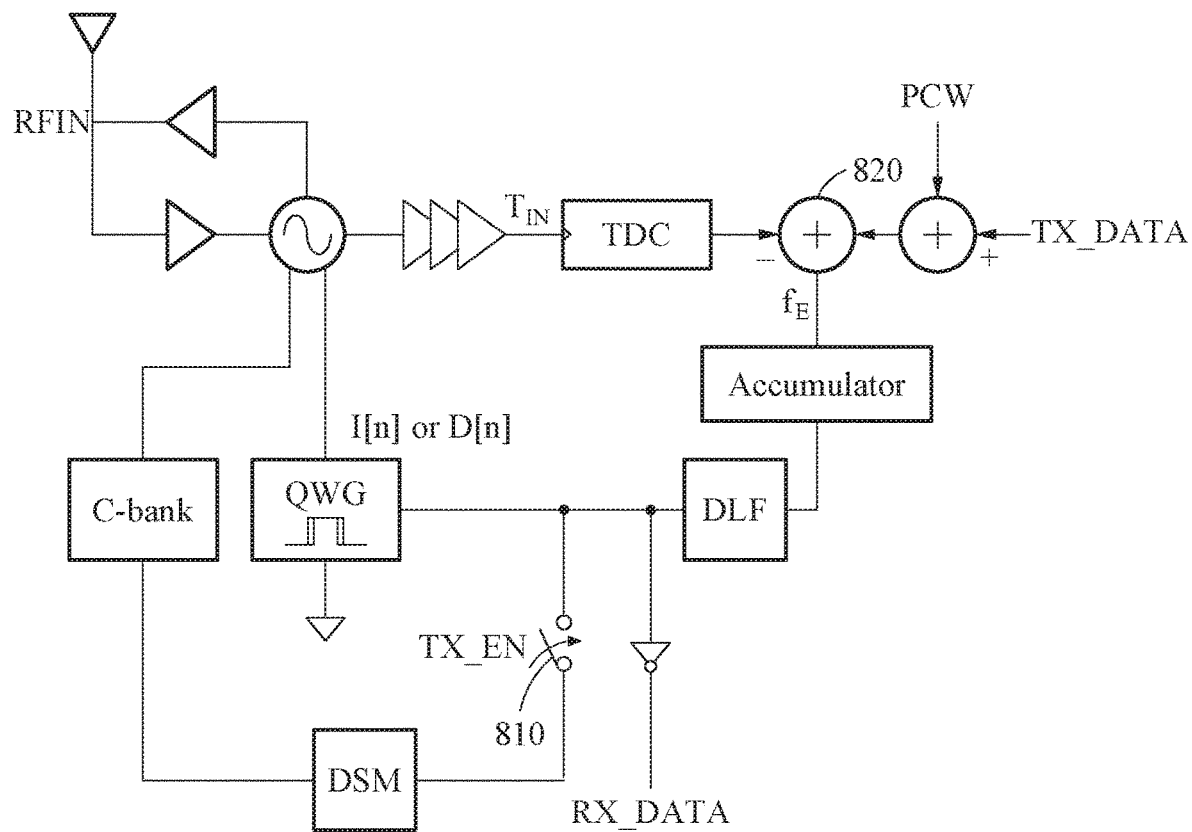
FIG. 8 illustrates an example communication apparatus that transmits and receives a wireless signal, in accordance with one or more embodiments.

FIG. 8 illustrates an example communication apparatus that transmits and receives a wireless signal, in accordance with one or more embodiments.

Referring to FIG. 8, the communication apparatus may transmit, as well as receive, a wireless signal. The communication apparatus may include a switch 810 configured to select one of a reception mode and a transmission mode. When the communication apparatus operates in the reception mode, the switch 810 may be powered off. In a non-limiting example, when the communication apparatus operates in the transmission mode, the switch 810 may be powered on, and when the communication apparatus operates in the transmission mode, a transmission signal TX_DATA to be transmitted may be input to a subtractor 820. An example of an operation of the communication apparatus in the transmission mode will be further described below with reference to FIG. 9.

Figure 9:
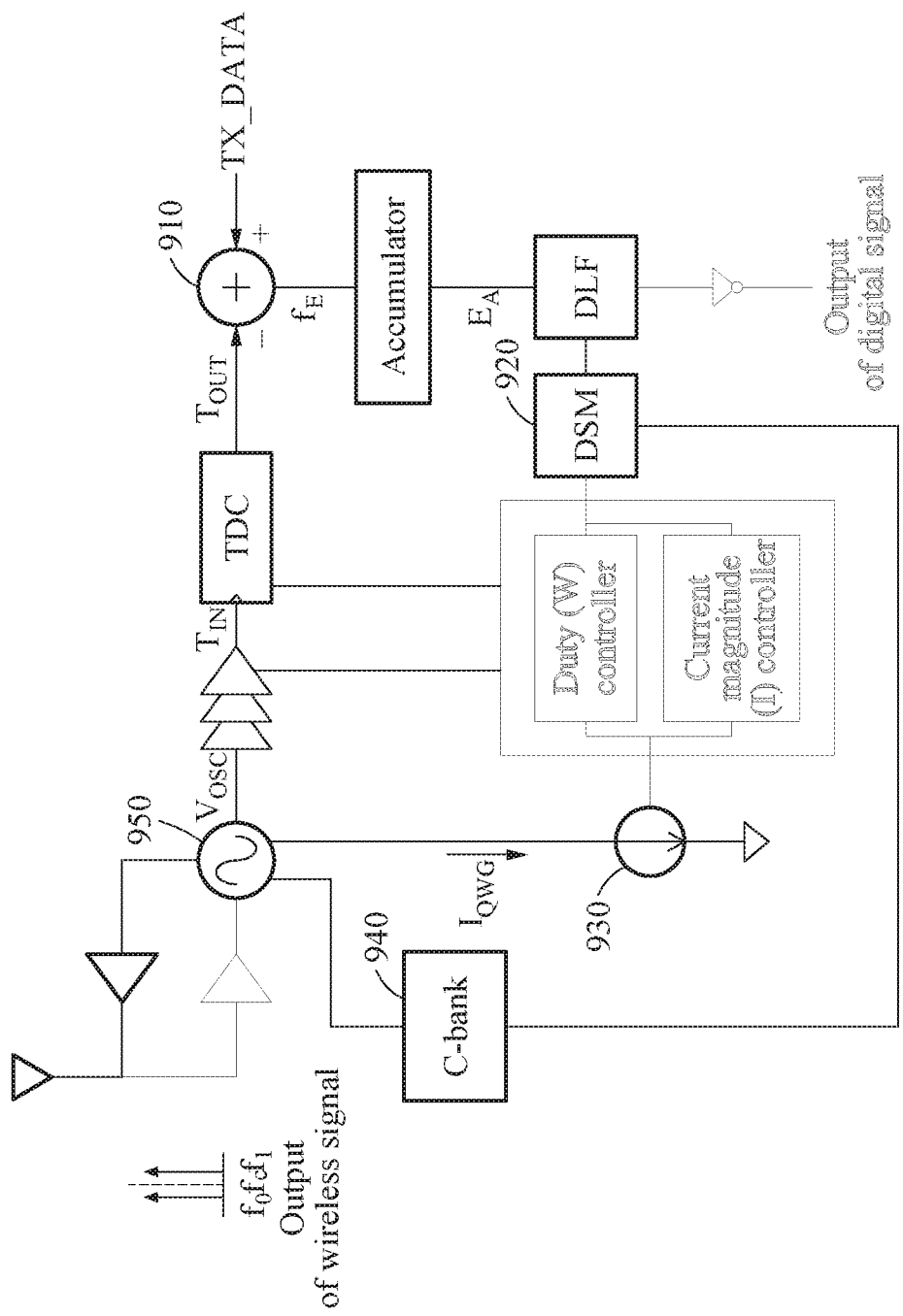
FIG. 9 illustrates an example transmission operation of a communication apparatus, in accordance with one or more embodiments.

FIG. 9 illustrates an example transmission operation of a communication apparatus, in accordance with one or more embodiments.

Referring to FIG. 9, the communication apparatus may operate in a transmission mode. A subtractor 910 receives, as an input, a transmission signal TX_DATA to be transmitted. A DSM 920 controls a current source 930 and allows a driving current to be output as a constant current instead of being quenched. Accordingly, an oscillator 950 continues to be driven. The DSM 920 also controls a C-bank 940 to fix the oscillator 950 at an operating frequency corresponding to the transmission signal TX_DATA. Here, a phase lock loop (PLL) may be applied. A wireless signal generated by the oscillator 950 at the operating frequency corresponding to the transmission signal TX_DATA is output through an antenna.

Figure 10:
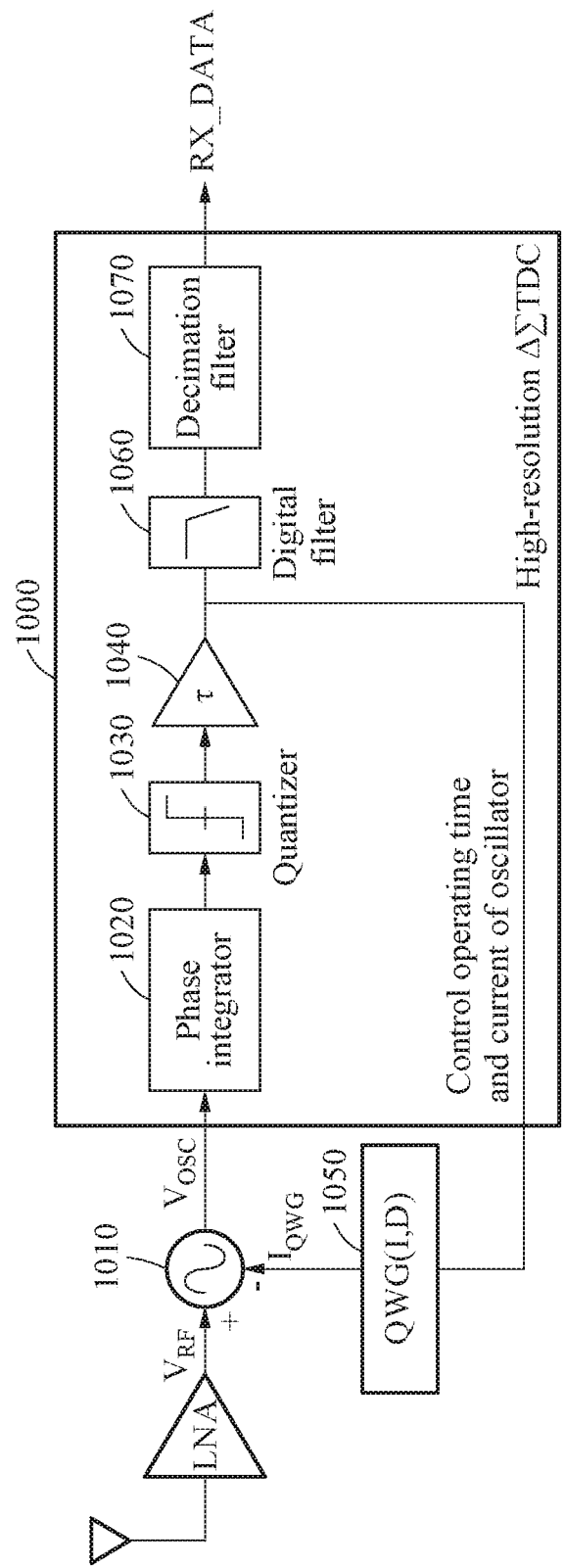
FIGS. 10 and 11 illustrate examples of a communication apparatus, in accordance with one or more embodiments.
Figure 11:
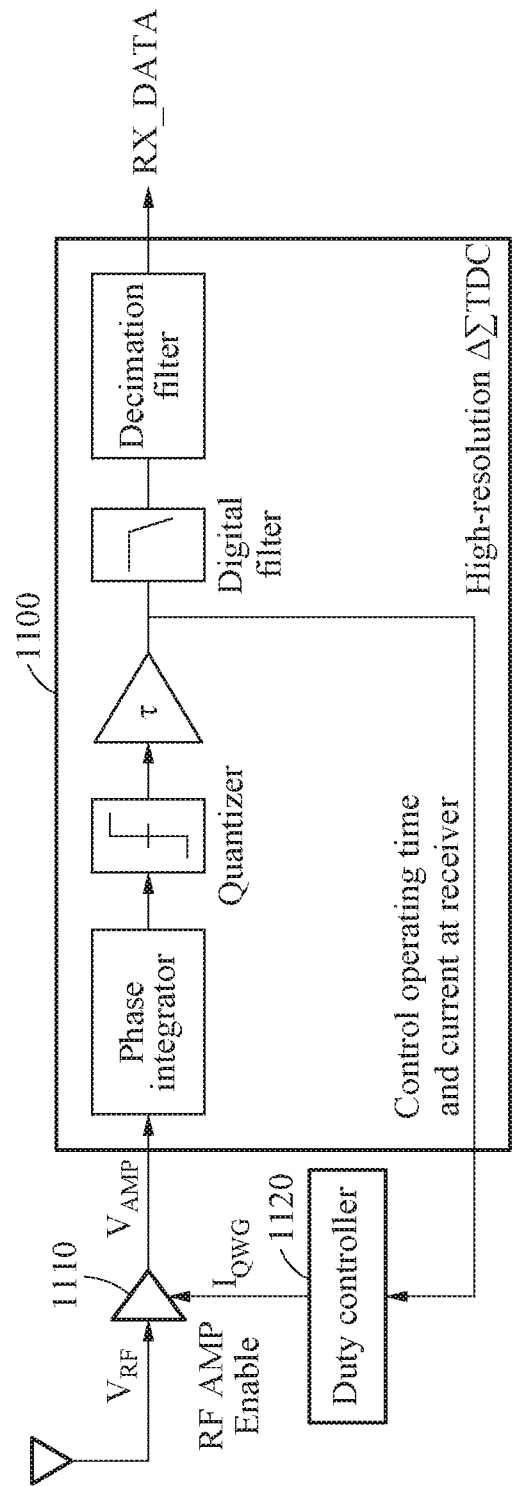

FIGS. 10 and 11 illustrate examples of a communication apparatus, in accordance with one or more embodiments.

Referring to FIG. 10, a communication apparatus 1000 includes an oscillator 1010, a phase integrator 1020, a quantizer 1030, a scaler 1040, a current source 1050, a digital filter 1060, and a decimation filter 1070. The communication apparatus of FIG. 10 may have a structure in which an RF-front-end including an LNA and the oscillator 1010 is combined with a delta-sigma analog-to-digital converter (ADC). An output of the oscillator 1010 corresponding to an RF input, may be measured by a high-resolution delta-sigma TDC.

The oscillator 1010 may be driven based on a driving current $I_{QWG}$, and generates an oscillating signal $V_{OSC}$ based on a received wireless signal $V_{RF}$. The phase integrator 1020 may integrate a phase of the oscillating signal $V_{OSC}$, and the quantizer 1030 may quantize the integrated signal $V_{OSC}$. The scaler 1040 may scale a quantized digital signal and control the current source 1050. In an example, a magnitude and/or a duty ratio of the driving current $I_{QWG}$ output from the current source 1050 may be controlled. The current source 1050 functions as a digital-to-analog converter (DAC). A period of the driving current $I_{QWG}$ is set to be less than ½ times a modulation period of the wireless signal $V_{RF}$, and the wireless signal $V_{RF}$ is oversampled. Also, a signal amplified by the scaler 1040 passes through the digital filter 1060 and the decimation filter 1070, and accordingly a digital-converted reception signal RX_DATA corresponding to the wireless signal $V_{RF}$ is determined.

For example, an output of the quantizer 1030 is transferred to the current source 1050 that functions as a DAC, and is used to control a magnitude of a phase and/or a frequency of the oscillating signal $V_{OSC}$ output from the oscillator 1010. The magnitude of the phase of the oscillating signal $V_{OSC}$ is accumulated in the phase integrator 1020 and represented as a digital output by passing through the quantizer 1030. An average of differences in a phase and/or an input frequency of a signal is represented as a difference in an average value of high-resolution delta-sigma TDC outputs, and thus an RF-modulated signal may be digitally restored through the above-described structure.

Operations of blocks other than the oscillator 1010 may be the same as operations of a delta-sigma TDC. The above structure may be used as a general-purpose digital RF structure by minimizing an analog block and maximizing a block with a digital circuit in the communication apparatus.

Referring to FIG. 11, a communication apparatus may include an amplifier 1110 instead of an oscillator. The amplifier 1110 may be driven based on a driving current $I_{QWG}$, and may generate an amplified signal $V_{AMP}$ by amplifying a received wireless signal $V_{RF}$. A duty ratio of the driving current $I_{QWG}$ may be controlled by a duty controller 1120. Operations of blocks other than the amplifier 1110 may be the same as operations of a delta-sigma TDC. The above description of FIG. 10 is also applicable to the operations of the blocks, and thus further description thereof is not repeated herein.

Figure 12:
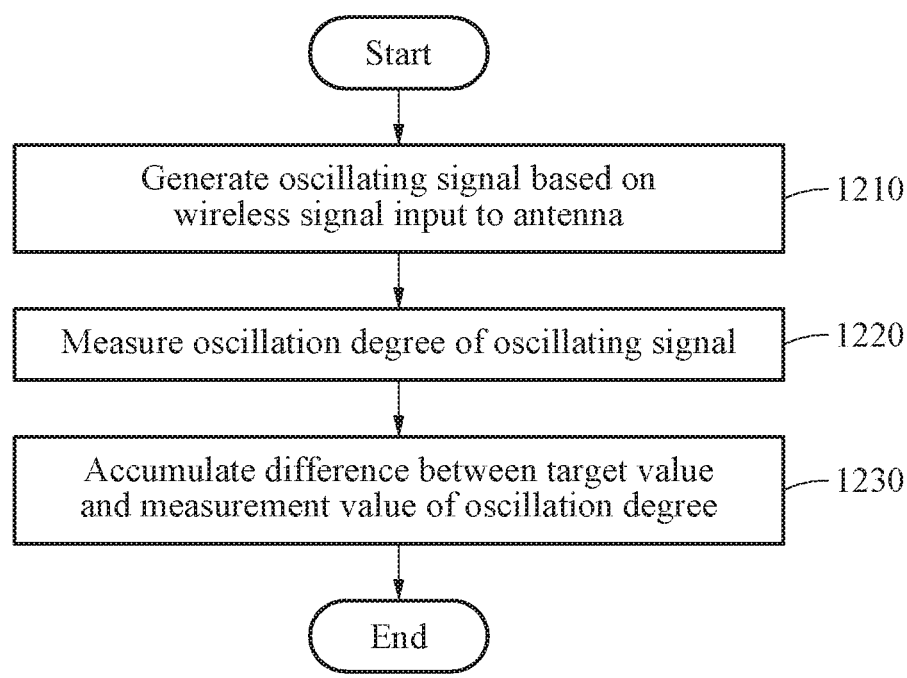
FIG. 12 illustrates an example communication method, in accordance with one or more embodiments.

FIG. 12 illustrates an example of a communication method, in accordance with one or more embodiments. The operations in FIG. 12 may be performed in the sequence and manner as shown. One or more blocks of FIG. 2, and combinations of the blocks, can be implemented by special purpose hardware-based computer that perform the specified functions, or combinations of special purpose hardware and computer or processor instructions. In addition to the description of FIG. 12 below, the descriptions of FIGS. 1-11 are also applicable to FIG. 12, and are incorporated herein by reference. Thus, the above description may not be repeated here.

The communication method of FIG. 12 may be performed by, for example, a communication apparatus.

Referring to FIG. 12, in operation 1210, the communication apparatus generates an oscillating signal based on a wireless signal input to an antenna, in a state in which a driving current is on. In operation 1220, the communication apparatus measures an oscillation degree of the oscillating signal. In operation 1230, the communication apparatus accumulates a difference between a target value and a measurement value of the oscillation degree. The wireless signal may be determined based on a cumulative signal corresponding to the accumulated difference.

As described above, even a communication apparatus with a finite battery size may measure a fine frequency difference using a high-resolution TDC and may receive a wireless signal with a high accuracy regardless of a jitter. Although an example in which a wireless signal is modulated by an FSK has been mainly described, the above descriptions are also applicable to an example in which a wireless signal is modulated by an ASK, an OOK or a PSK.

The above descriptions of FIGS. 1 through 11 are also applicable to the communication method of FIG. 12, and thus further description is not repeated herein.

The communication apparatus 100, communication apparatus 1000, communication apparatus 1100, and other apparatuses, devices, and other components described herein are implemented as, and by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-12, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communication apparatus comprising:
   an antenna configured to receive a wireless signal;
   an oscillator, configured to be driven by a driving current, and configured to generate an oscillating signal based on the wireless signal;
   a measurer configured to measure an oscillation degree of the oscillating signal; and
   an accumulator configured to accumulate a difference between a target value and a measurement value of the oscillation degree,
   wherein a value of the wireless signal is determined based on a cumulative signal corresponding to the accumulated difference.

2. The communication apparatus of claim 1, wherein the value of the wireless signal is determined based on a change trend in the cumulative signal over a period of time.

3. The communication apparatus of claim 1, wherein the value of the wireless signal is determined based on a determination that the cumulative signal gradually increases or decreases over a period of time.

4. The communication apparatus of claim 1, wherein the driving current is controlled based on the cumulative signal.

5. The communication apparatus of claim 4, wherein a magnitude and/or a duty ratio of the driving current is controlled based on the cumulative signal.

6. The communication apparatus of claim 1, wherein the oscillator is further configured to generate the oscillating signal with a startup time that decreases as a magnitude and/or a duty ratio of the driving current increases.

7. The communication apparatus of claim 1, wherein the driving current is controlled to reduce a magnitude of the cumulative signal.

8. The communication apparatus of claim 1, wherein the measurement value is determined based on any one or any combination of a frequency of the wireless signal and a magnitude and a duty ratio of the driving current.

9. The communication apparatus of claim 1, wherein the driving current has a period less than or equal to ½ times a modulation period of the wireless signal.

10. The communication apparatus of claim 1, wherein the oscillator and the measurer are configured to operate in an interval in which the driving current is high.

11. The communication apparatus of claim 1, wherein the oscillator is further configured to operate in a free running mode.

12. The communication apparatus of claim 1, wherein the oscillator is further configured to generate the oscillating signal that oscillates at one frequency among predetermined frequencies, based on the wireless signal.

13. The communication apparatus of claim 1, wherein the target value is a value that ranges between measurement values output from the measurer in response to wireless signals received at the communication apparatus.

14. The communication apparatus of claim 1, wherein the driving current is quenched.

15. The communication apparatus of claim 1, further comprising:
   a delta-sigma modulator (DSM) configured to output the driving current, and control a variable capacitor of the oscillator based on a transmission signal, and transmit the transmission signal.

16. The communication apparatus of claim 1, wherein the wireless signal is a signal that is modulated by any one or any combination of a frequency shift keying (FSK), an amplitude shift keying (ASK), and a phase shift keying (PSK).

17. The communication apparatus of claim 1, further comprising:
   an amplifier configured to be driven by the driving current, and configured to amplify the oscillating signal and transfer the amplified oscillating signal to the measurer.

18. A communication apparatus comprising:
   a radio frequency (RF) receiver configured to be driven by a driving current, and configured to generate an oscillating signal based on a received wireless signal, or configured to amplify the wireless signal;
   an integrator configured to integrate a frequency or a phase of the amplified wireless signal or the generated oscillating signal to generate an integrated oscillating signal; and
   a quantizer configured to quantize the integrated oscillating signal,
   wherein a value of the wireless signal is determined based on the quantized signal.

19. The communication apparatus of claim 18, wherein a magnitude and/or a duty ratio of the driving current is controlled based on the quantized signal.

20. A communication method comprising:
   generating an oscillating signal based on a wireless signal input to an antenna in a state in which a driving current is on;
   measuring an oscillation degree of the oscillating signal; and
   accumulating a difference between a target value and a measurement value of the oscillation degree,
   wherein a value of the wireless signal is determined based on a cumulative signal corresponding to the accumulated difference.

* * * * *